Dec. 4, 1962  G. GRUNEBERG ET AL  3,067,276
METHOD OF REGENERATING DOUBLE SKELETON CATALYST ELECTRODES
Filed June 4, 1958

INVENTORS
GERHARD GRUNEBERG
MARGARETE JUNG
HERBERT SPENGLER
EDUARD JUSTI
BY
ATTORNEYS

3,067,276
METHOD OF REGENERATING DOUBLE SKELETON CATALYST ELECTRODES

Gerhard Gruneberg and Margarete Jung, Oberhausen-Sterkrade, Herbert Spengler, Oberhausen-Holten, and Eduard Justi, Braunschweig, Germany, assignors, by mesne assignments, to Accumulatoren-Fabrik Aktiengesellschaft, Frankfurt am Main, Germany, and Siemens-Schuckert-Werke Aktiengesellschaft, Erlangen, Germany, both German corporations
Filed June 4, 1958, Ser. No. 739,941
Claims priority, application Germany June 6, 1957
8 Claims. (Cl. 136—164)

The present invention relates to the regeneration of catalyst electrodes, and more particularly to the regeneration and reactivation of double skeleton catalyst electrodes which have been exhausted by prolonged use in fuel cells.

Catalyst electrodes such as gas-diffusion electrodes are known. Where this type electrode is combined with another electrode of equal or different type in a suitable electrolyte, a fuel cell is formed.

It is known that double skeleton catalyst electrodes can be used in fuel cells for the direct chemical generation of electrical energy from a combustible gas such as hydrogen, carbon monoxide or other fuel gas, and an oxidizing agent, such as oxygen, air or a halogen. The production and operation of double skeleton catalyst electrode fuel cells is more fully treated in U.S. patent application No. 542,434, filed October 24, 1955, issued to U.S. Patent No. 2,928,891.

Briefly, however, these electrodes comprise a carrier skeleton structure having metallic conductivity in the interspaces of which skeleton granules of a catalytic substance are embedded. Such electrode structures may be formed, for example, by the process of intermixing from about 80 to 20% by weight of a finely pulverized carrier metal, such as nickel, cobalt, copper, silver or iron, which is to serve as the support skeleton, with about 20 to 80% by weight of a finely pulverized quantity of a Raney alloy, such as an alloy of about 20 to 60% by weight of nickel as active component with about 80 to 40% by weight of aluminum, silicon, magnesium, or zinc as inactive component which is to serve as the Raney catalyst skeleton, and thereafter shaping, pressing and sintering the mixture and dissolving out the inactive alloy component by strong alkali treatment. The resulting double skeleton catalyst electrode contains a carrier metal skeleton and arranged thereon a Raney catalyst active component which is a nickel alloy from which the inactive component has been dissolved out by strong alkali action.

Double skeleton catalyst electrodes on the fuel gas side of the fuel cell may contain such metals as iron, cobalt or preferably nickel for both the carrier skeleton and the ctaalyst skeleton if the fuel gas is hydrogen, or preferably copper if the fuel gas is carbon monoxide. The double skeleton catalyst electrodes on the oxidizing agent or oxygen side of the fuel cell, on the other hand, may contain nickel or preferably silver, for both the carrier and catalyst skeleton. In normal operation, these electrodes are preferably maintained in a strongly alkaline electrolyte.

It has been found, however, that electrodes of this type under continuous operation in fuel cells frequently undergo a decrease in activity and in anodic current density of the fuel gas electrode and a decrease in activity and in cathodic current density of the oxidizing agent or oxygen electrode after a certain period of time.

Reductions in performance of the aforementioned types are due mainly to the following:

(a) Precipitates depositing on the Raney catalyst surfaces of the double skeleton catalyst electrodes on the fuel gas side and on the catalyst surfaces of the double skeleton catalyst electrodes on the oxidizing agent or oxygen side, thereby impeding the desired reaction at the electrodes. Such precipitates may even eventually plug the pores of the electrodes.

(b) Deactivation or poisoning of the Raney catalyst of the double skeleton catalyst electrodes on the fuel gas side due to formation of hydroxides, oxides or sulphides thereof, and poisoning of the catalyst of the double skeleton catalyst electrodes on the oxidizing agent or oxygen side due to sulfide formation of the electrode metals.

Further causes of inefficiency in continuous operation of fuel cells may be attributed to undesirable chemical side reactions that occur at double skeleton catalyst electrodes during continuous operation, particularly at higher temperatures.

These may be traced on the fuel gas side to the following:

(a) Attack by the concentrated alkaline solution and/or of impurities contained therein.

(b) Excessive deviation of the stationary potential from the reversible potential in case of excessive drain of current, due to the fact that the equalization of concentration between the electrolyte contained in the electrode and diluted with reaction water and the electrolyte surrounding the electrode is too slow as compared with the drain of current so that a concentration polarization takes place.

(c) Excessively high content of oxygen, halogen, and/or hydrogen sulfide in the incoming fuel gas.

(d) Excessively high content of oxygen (from decomposition of hydrogen peroxide, formed at the electrode for the oxidizing agent) and/or of chlorine and/or sulfate ions in the alkaline electrolyte, which may originate from impurities of parts of the apparatus and of the reactants used.

(e) Decomposition of water at the Raney catalyst surfaces.

(f) Carbonyl components contained in the fuel gas, which may be formed by reaction of carbon monoxide with the metals of the containers, pipelines and, as the case may be, with the electrode materials, e.g. carbonyls of iron, cobalt and nickel.

(g) Sulphur or organic sulphur compounds contained in the packing materials in contact with the double skeleton catalyst electrode.

The undesirable side reactions that occur on the oxidizing agent or oxygen side may be traced to the following:

(a) Attack by the concentrated alkaline solution and/or of impurities contained therein.

(b) Halogen and/or hydrogen sulphide contained in the incoming oxygen or air.

(c) Sulphur or organic sulphur compounds contained in the packing materials in contact with the electrode.

Accordingly, it is an object of this invention to provide a method of regenerating and reactivating double skeleton catalyst electrodes of the above-mentioned type which have become exhausted in continuous operation.

It is another object of this invention to provide a method of regenerating these exhausted electrodes in a simple and convenient three stage process to store them to their initial activity.

It is a further object of this invention to provide a method of regenerating exhausted electrodes which is economical to operate and efficient in performance.

Other and further objects will become apparent from a study of the within specification and the accompanying drawing in which.

Figure 1:
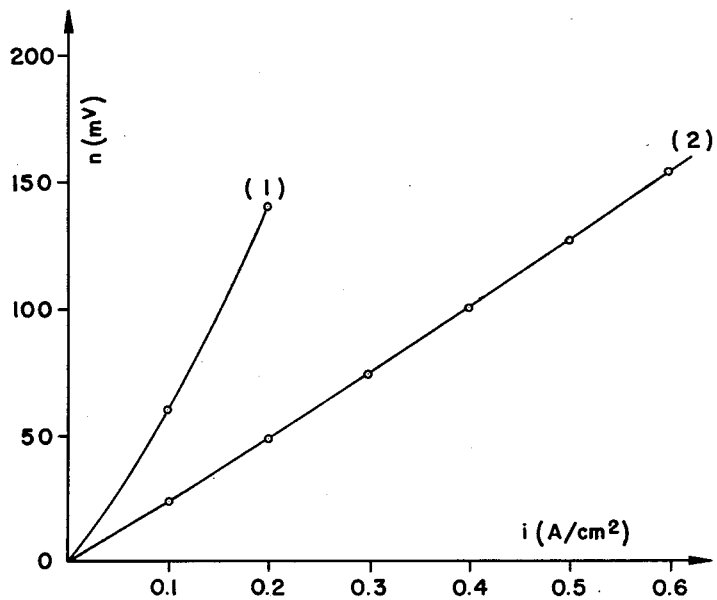
FIGURE 1 represents a graph of the polarization-current density curves of the fuel gas electrode of Example 1 before and after regeneration in accordance with the present invention.

It has been the experience of those in the art heretofore, that iron, nickel, cobalt and copper ions are precipitated as voluminous hydroxides from the alkaline electrolyte of a fuel cell at any concentration thereof or they are obtained as oxides or sulphides by the above-enumerated undesirable side reactions. Lost residues of inactive components such as aluminum or silica which have not been dissolved out of the Raney catalyst by strong alkali treatment in the activation of the double skeleton catalyst electrodes dissolve during continuous operation of the fuel cell and remain in solution as alkali aluminates and as alkali silicates, respectively, where the pH of the alkaline electrolyte is in excess of 12. These impurities, however, precipitate as gelatinous aluminum hydroxide and water-containing silica, respectively, when the pH has dropped below the value mentioned above.

The alkalinity of the electrolyte is lowered, on the one hand, by the dissolution of the above-mentioned substances therein, and on the other hand, is likewise lowered in the vicinity of the pores of the fuel gas electrodes, from which an anodic current is drawn, by the dissolution of hydrogen ions at the interface of the three phases, namely, catalyst, electrolyte, fuel gas, according to the electrode reaction:

$$H \rightarrow H^+ \ (aq) + e(Me)$$

and by the water associated therewith. It is particularly in the interior of the pores that a rapid equalization of concentration with the surrounding external electrolyte bath is not possible. Therefore, precipitation of aluminum hydroxide and/or silica will most often occur in these pores.

The above shortcomings of fuel cell operation have caused the electrodes to become exhausted but no satisfactory procedure for reactivating and regenerating these exhausted electrodes has proved effective up to now. It may be stated that, basically, regeneration of double skeleton catalyst electrodes requires that the voluminous precipitates of hydroxides of the metals, iron, nickel, cobalt, copper and aluminum and the precipitates of silica must be removed from the fuel cell bath on the alkaline side, since not only the hydroxides of these metals but also the pure metals themselves would be dissolved in a bath on the acid side. Furthermore, the oxides and sulphides of the metals, iron, nickel, cobalt and copper of the fuel gas electrodes, and the sulphides of the metals nickel and silver and the chloride of silver of the oxidizing agent or oxygen electrodes must either be reduced to the pure metals or dissolved without the necessity of subjecting the double skeleton catalyst electrodes to a reduction in a current of hydrogen gas at higher temperatures. This is necessary since if such reduction were attempted, the highly active low-temperature catalyst still present in the electrode would re-crystallize and thereby suffer a decrease in activity.

In accordance with the process of the present invention it has been discovered that total regeneration of fuel cell double skeleton catalyst electrodes containing iron, nickel, cobalt and silver may be obtained by treating the electrodes in a first step with a concentrated alkaline solution at a temperature at or approximately at the boiling temperature of the solution with evolution, if necessary or desired, of hydrogen; in a second step with a lower concentration alkaline solution at a temperature at or approximately at the boiling temperature of the solution and in the presence of compounds dissolving the hydroxides, oxides or other compounds of the above-mentioned metals; and in a third step in a concentrated alkaline solution with cathodic evolution of hydrogen thereby reducing oxides and sulphides of iron, nickel, cobalt and copper as well as sulphides and chlorides of silver, and thereafter removing the alkaline solution.

In the first and third step temperatures of 70 to 110° C. may be used.

Water-containing silica precipitates and gelatinous aluminum hydroxide precipitates can be dissolved by boiling in a concentrated alkaline solution having a pH greater than 12. Accordingly, in the first regeneration step, the electrodes are treated with an alkaline solution within the range of 1-normal to 10-normal and preferably 6-normal to free the electrodes from these precipitates. For this purpose, the electrodes may be suitably boiled in the alkaline solution, or the solution may be heated approximately to its boiling temperature and forced through the pores of the electrodes. If necessary, or desired, hydrogen may be evolved during this regeneration step at the electrode being treated.

Precipitates of hydroxides and/or oxides of iron, nickel, copper and cobalt can be dissolved in an alkaline solution if compounds forming soluble complexes with these metals are added to the alkaline solution. Hence, in the second regeneration step, the double skeleton catalyst electrodes are advantageously treated with an alkaline solution having a pH within the range of pH 8 to 14 and preferably of pH 9 to 12 in the presence of compounds capable of dissolving the hydroxides of iron, nickel, cobalt and copper thereby freeing the electrodes from the precipitates of hydroxides and/or from oxides of these metals.

Best results are obtained where this treatment is effected at temperatures ranging between 50° C. and the boiling point of the solution. The electrodes to be reactivated are preferably held in the above-mentioned solution at this temperature for an extended period of time and thereafter the hot solution may be forced through the porous double skeleton catalyst electrodes for additional effect.

For optimum treatment in the second regeneration step, it is advantageous to supplement the action of the alkaline solution by adding thereto one or more of the following compounds: tartaric acid, citric acid, or salts thereof; ethylene diamine tetraacetic acid or salts thereof; nitrilo-triacetic acid or salts thereof, as for example, potassium-sodium-tartrate (Seignette salt), and the disodium salt of ethylene diamine tetraacetic acid (commercially available under the trade name "Komplexon III"). These compounds may be used in an amount sufficient to attain a concentration of from 5 to 40% by weight of the alkaline solution.

It is well-know that electrode surfaces are roughened generally by alternate reduction and oxidation. Therefore, in accordance with the process of the present invention, the second regeneration step may be aided by passing an alternate current of from 10 to 200 milliamps/cm.$^2$ and preferably of about 100 ma./cm.$^2$ through the electrode.

The third regeneration step, i.e. the cathodic evolution of hydrogen, is likewise effected in the presence of an alkaline solution having about the same concentration and temperature as that used in the first regeneration step. In this step, the particular electrode to be regenerated, i.e. both the electrode used as fuel electrode and that used for the oxidizing agent are connected in an electrolyzer arrangement and subjected to a cathodic load, i.e. electrons are supplied from an external voltage source.

In this way, the aforementioned complexes absorbed in the second step are desorbed, last residues of undissolved oxides and sulphides of iron, nickel, copper, and sulphides and chlorides of silver are reduced to the pure metals, and the hydrogen required for the activity of the Raney catalyst is again incorporated. This is preferably accomplished with the use of a nickel or platinum plate as the oxygen-evolving electrode and by applying a current of from 100 to 200 ma./cm.$^2$. It is advantageous in accordance with the preferred embodiment of the invention to replace the treating alkaline solutions by fresh solutions in each of the first, second and third regeneration steps. It has been found that a particularly rapid and total reactivation of the electrodes may be obtained where potassium hydroxide solution is used as the alkaline treating solution. However, other alkaline solutions which may also be used for favorable results include those of sodium hydroxide and sodium carbonate.

Upon completion of the regeneration, it has been found suitable to remove the alkaline solution by gradually reducing its concentration and decreasing the temperature. The newly regenerated electrodes are preferably stored in a reduced atmosphere for obvious reasons.

The following exmples are given to illustrate the present invention but it is to be understood that the invention is not to be limited thereto.

*Example 1*

Figure 2:
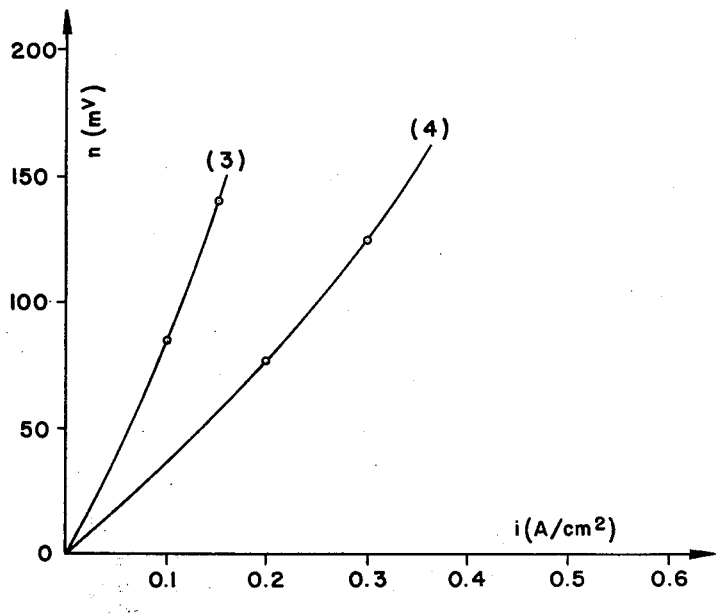
FIGURE 2 represents a graph of the polarization-current density curves of the fuel gas electrode of Example 3 before and after regeneration in accordance with the present invention.

A current of 0.2 a./cm.$^2$ was drawn for 350 hours from a double skeleton hydrogen electrode of nickel operated at 80° C. in a 6 normal potassium hydroxide solution. Thereafter, the electrode showed the polarization-current density curve of FIG. 1. Due to $CO_2$ contained in the hydrogen supplied, the electrode had a layer of carbonate on the side contacting the gas. Moreover, its pores were partially plugged by precipitates of nickel and aluminum hydroxides and by silica. It was first treated with an about 6 normal potassium hydroxide solution of 100° C. and then two times with a boiling solution containing about 10% of disodium salt of ethylene diamine tetraacetic acid (Komplexon III) and having about pH 9.5. Thereafter, hydrogen was evolved for 10 hours at 90° C. in the presence of about 6 normal potassium hydroxide solution with 200 ma./cm.$^2$. Following this, the substantially better polarization-current density curve of FIG. 2 was obtained.

*Example 2*

A current of 0.2 a./cm.$^2$ was continuously drawn from a double skeleton hydrogen electrode of nickel operated at 80° C. in a 6 normal KOH solution with the electrode showing a stationary polarization of 70 mv. Due to interruption of the hydrogen supply, the stationary potential of the electrode broke down but was unnoticed and, since it was operated in a half element measuring cell (i.e., in a cell in which a hydrogen-evolving electrode rather than an oxygen electrode is used on the other side of the fuel gas electrode and in which the current is drawn from the fuel gas electrode by means of a suction voltage), oxygen was evolved for 10 hours at the electrode. Thereafter, the electrode was deactivated and plugged due to serious formation of nickel oxide and nickel hydroxide. After having been again put into operation, the potential broke down after a short period of time at a current of only 10 ma./cm.$^2$ drawn from the electrode. It was only following a regeneration by the method described in Example 1 that a current of 0.2 a./cm.$^2$ could be continuously drawn from the electrode at an anodic polarization of 75 mv.

*Example 3*

A current of 0.03 a./cm.$^2$ was drawn for 300 hours from a double skeleton nickel electrode operated with CO in 6 normal potassium hydroxide at 80° C. Thereafter, the electrode showed the polarization-current density curve of FIG. 3. The output of the electrode had been reduced by iron hydroxide precipitating in the pores (due to supply of CO containing iron carbonyl) and by formation of a layer of carbonate on the side of the electrode contacting the gas. The electrode was first treated with an about 6.5 normal potassium hydroxide solution at a temperature near the boiling point and then three times for 3 hours at about 100° C. with an aqueous solution containing about 6% of Seignette salt and about 6% of disodium salt of ethylene diamine tetraacetic acid (Komplexon III) and having about pH 9. Finally, hydrogen was evolved at the electrode at the same temperature with 200 ma./cm.$^2$ in the presence of an about 6 normal potassium hydroxide solution. Thereafter, the polarization-current density curve of FIG. 4 was obtained under the same operating conditions.

*Example 4*

A double skeleton oxygen electrode of silver was operated for 1900 hours in 6 normal KOH at 80° C. with a cathodic load of 0.2 a./cm.$^2$. During this operation, the electrode was partially poisoned by the sulphur-containing rubber packing and by inhibitors which, in the hot solution exerts an oxidizing action due to some $H_2O_2$ and $O_2$ contained therein which were dissolved out of the electrolyte vessel consisting of polyethylene. In addition, iron hydroxide originating from stainless steel parts dipping into the electrolyte was contained in the electrolyte.

The electrode was regenerated in the manner described in Example 3 except that the second regeneration step was effected with a solution containing only about 10% of Seignette salt and no disodium salt of ethylene diamine tetraacetic acid. By this regeneration, the stationary potential of the electrode could be positivize under the same operating conditions.

While the foregoing specification and accompanying drawing have been set forth for the purposes of illustration, it will be obvious to those skilled in the art that various modifications and changes may be made without departing from the spirit and scope of the invention which is to be limited only by the appended claims.

What we claim is:

1. A process of regenerating exhausted double skeleton catalyst electrodes which comprises a first step of subjecting the electrode to reaction with a concentrated alkaline solution having a concentration of between 1 N and 10 N, at substantially its boiling temperature; a second step of subjecting the electrode to reaction with an alkaline solution having a lower concentration than said first mentioned alkaline solution, at a temperature between 50° C. and the boiling temperature of said alkaline solution, said solution having a pH of between 8 and 14 and containing a compound capable of dissolving hydroxide, oxide and salt impurities of the electrode metal, said compound being a member selected from the group consisting of tartaric acid, citric acid, ethylene diamine tetraacetic acid, nitrilotriacetic acid and salts thereof and a third step of applying a current sufficient to evolve hydrogen while maintaining said electrode in a concentrated alkaline solution at the boiling point thereof to thereby reduce said impurities and regenerate the electrode.

2. A process of regenerating double skeleton catalyst electrodes containing a metal selected from the group consisting of iron, nickel, cobalt, copper, and silver, which comprises a first step of subjecting the electrode to reaction with a concentrated alkaline solution having a concentration of between 1 N and 10 N, at substantially its boiling temperature; a second step of subjecting the electrode to reaction with an alkaline solution having a lower concentration than said first mentioned alkaline solution at a temperature between 50° C. and the boiling temperature of said alkaline solution, said solution having a pH of between 8 and 14 and containing a compound capable of dissolving hydroxide, oxide and salt impurities of the electrode metal, said compound being a member selected from the group consisting of tartaric acid, citric acid, ethylene diamine tetraacetic acid, nitrilotriacetic acid and salts thereof and a third step of applying a current sufficient to evolve hydrogen while maintaining said electrode in a concentrated alkaline solution at the boiling point thereof thereby regenerating the electrode catalyst, and thereafter removing said alkaline solution.

3. A process according to claim 2 wherein said compound capable of dissolving hydroxide, oxide and salt impurities of said electrode metal in said second step is ethylene diamine tetraacetic acid.

4. A process according to claim 1, in which said treatment with alkali in the first step is carried out by boiling the electrode in the alkaline solution for a period of time sufficient to dissolve the water containing silica and aluminum hydroxide precipitates from the double skeleton catalyst electrodes.

5. A process according to claim 1, in which said treatment with alkali in the first step is carried out by forcing the alkaline solution through the pores of the electrodes.

6. A process according to claim 2, in which said treatment with said alkaline solution in the second step is carried out by forcing said alkaline solution through the porous double skeleton electrode.

7. A process as in claim 2 wherein an alternating current of from 10 to 200 milliamperes per square centimeter is passed through the electrode duriing the second step.

8. A process as in claim 2 wherein the evolution of hydrogen is effected in the third step by applying the current to a nickel plate as oxygen-evolving electrode in an electrolyzer arrangement with the electrode thereby being reactivated.

References Cited in the file of this patent

UNITED STATES PATENTS

| | | |
|---|---|---|
| 821,625 | Edison | May 29, 1906 |
| 1,431,982 | Richter et al. | Oct. 17, 1922 |
| 1,488,480 | Edison | Apr. 1, 1924 |
| 2,388,959 | Drew | Nov. 13, 1945 |